May 20, 1952  J. C. BARTCH ET AL  2,597,053
SPROUT DESTROYER
Filed Feb. 23, 1945  6 Sheets-Sheet 1

INVENTORS
JAMES C. BARTCH
GEORGE W. COUCH

BY John H. Cassidy
ATTORNEY

May 20, 1952 — J. C. BARTCH ET AL — 2,597,053
SPROUT DESTROYER
Filed Feb. 23, 1945 — 6 Sheets-Sheet 2
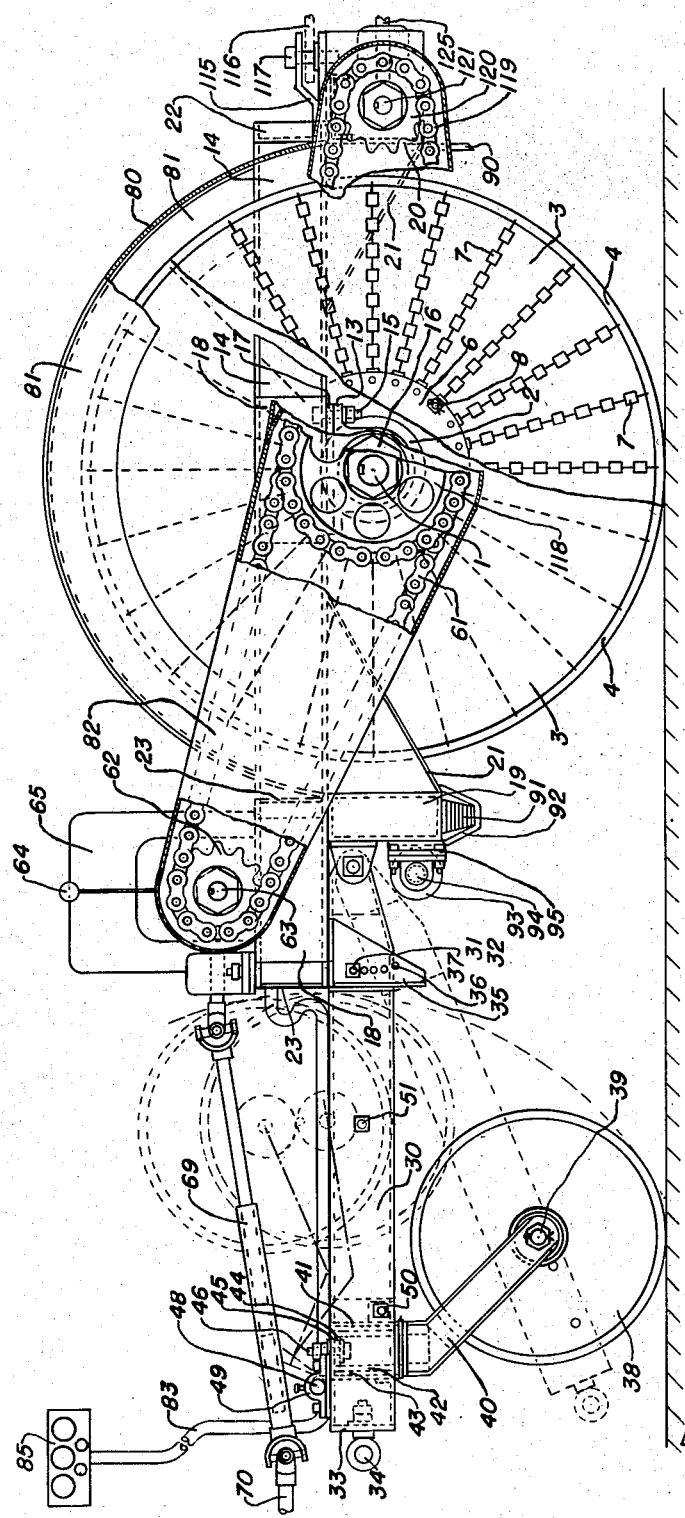
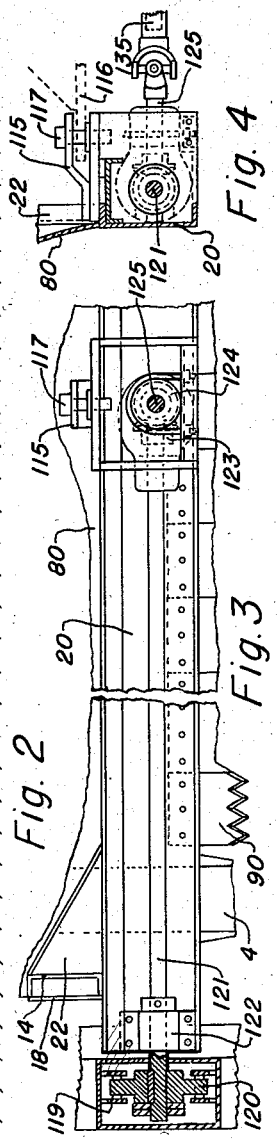
INVENTORS
JAMES C. BARTCH
GEORGE W. COUCH
By John H. Cassidy
ATTORNEY

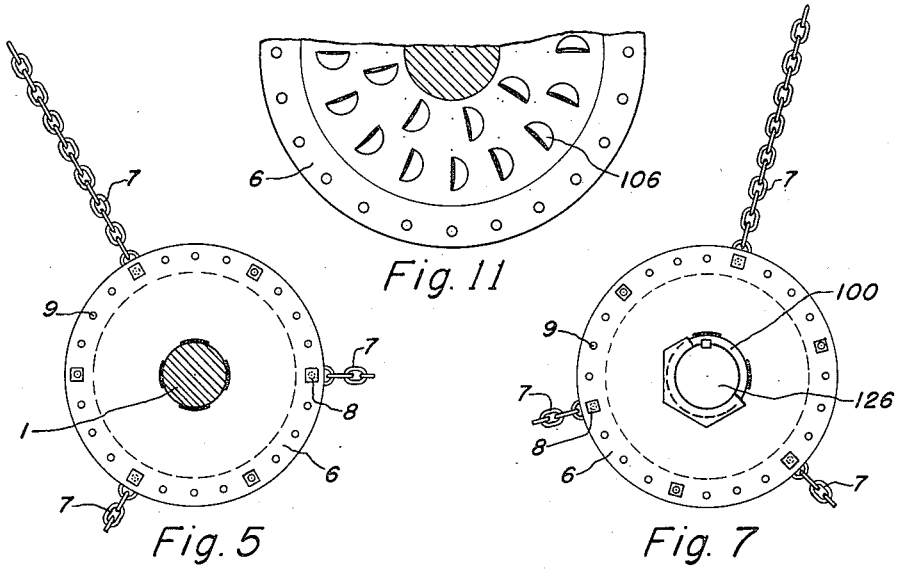
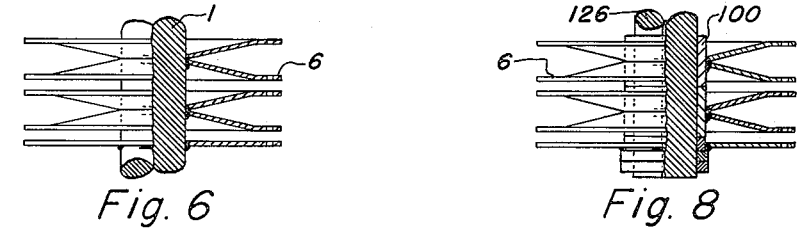
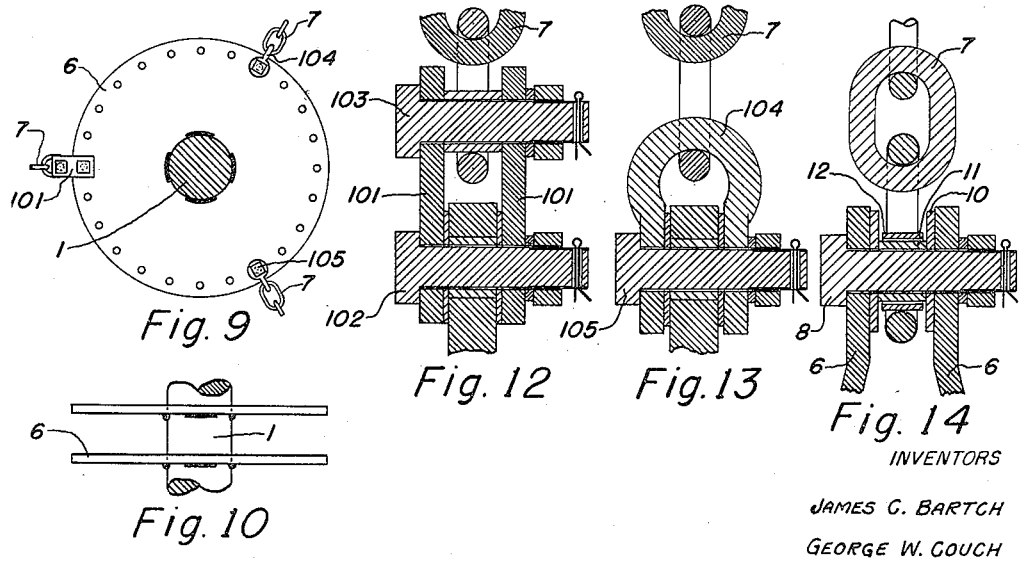

May 20, 1952 J. C. BARTCH ET AL 2,597,053
SPROUT DESTROYER
Filed Feb. 23, 1945 6 Sheets-Sheet 4

INVENTORS
JAMES C. BARTCH
GEORGE W. COUCH
By John H. Cassidy
ATTORNEY

May 20, 1952 J. C. BARTCH ET AL 2,597,053
SPROUT DESTROYER
Filed Feb. 23, 1945 6 Sheets-Sheet 5
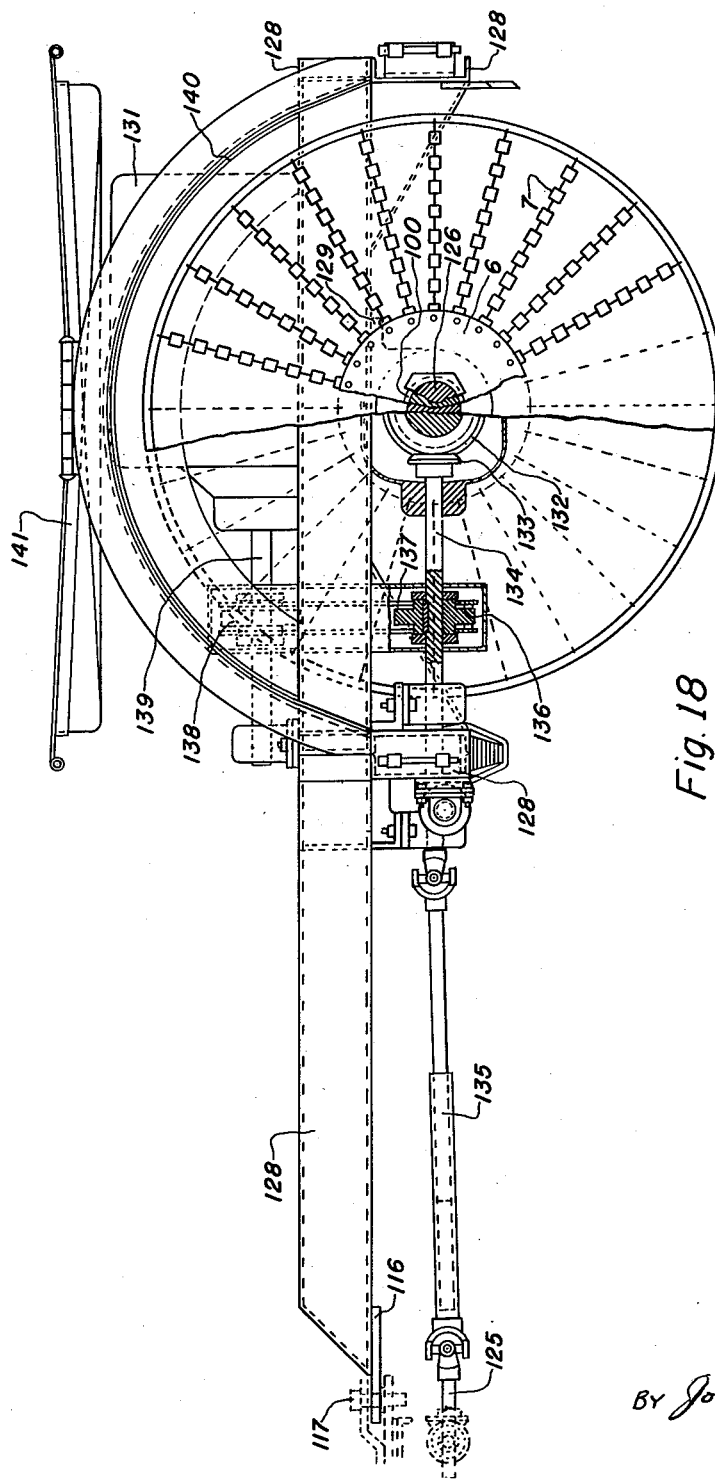
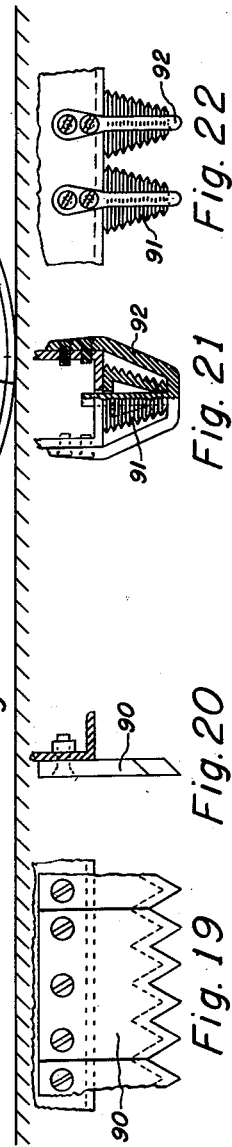
INVENTORS
JAMES C. BARTCH
GEORGE W. COUCH
BY John H. Cassidy
ATTORNEY

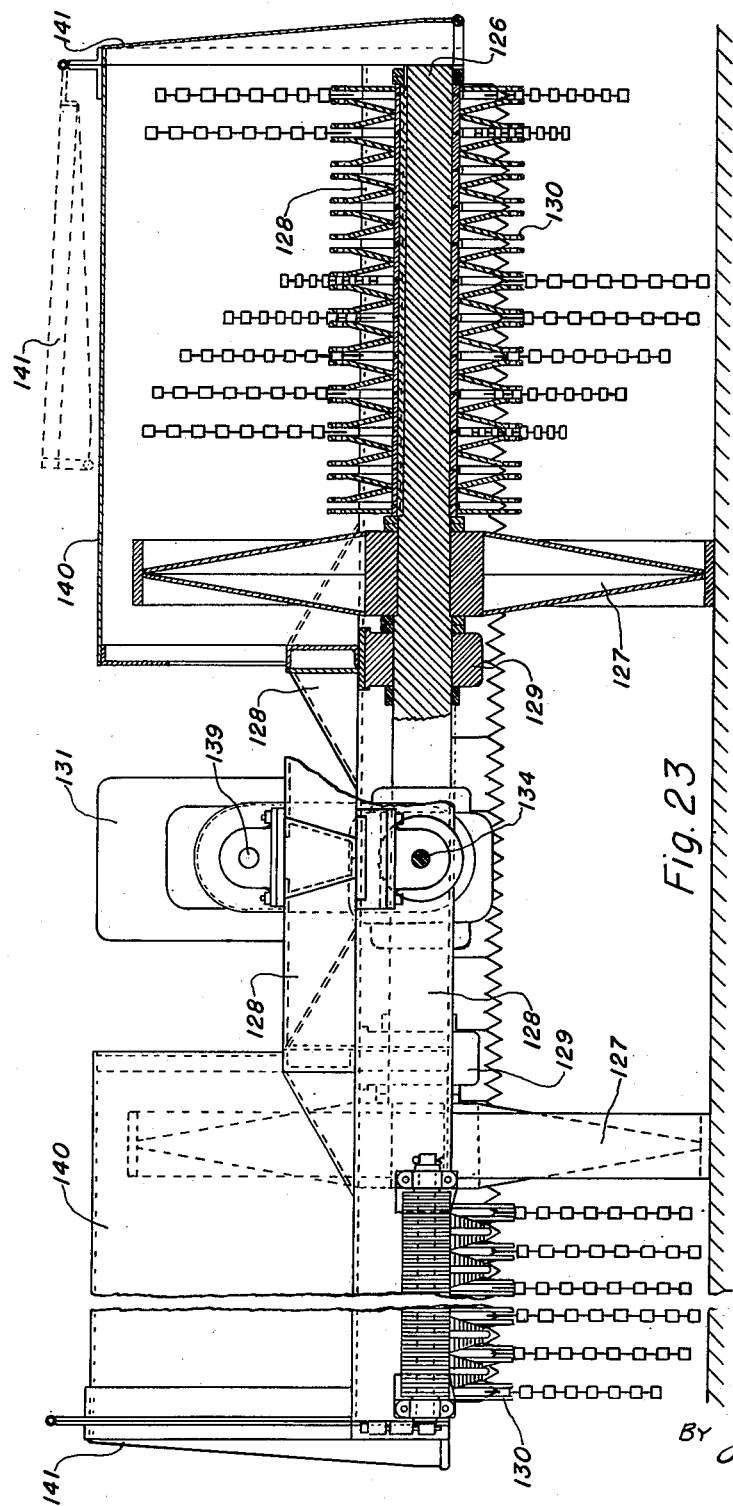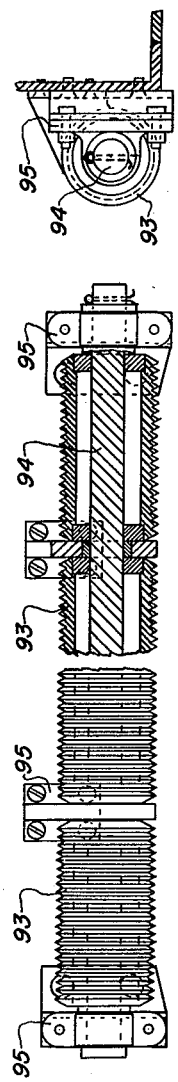

UNITED STATES PATENT OFFICE 2,597,053

SPROUT DESTROYER

James C. Bartch and George W. Couch,
Flat River, Mo.

Application February 23, 1945, Serial No. 579,466

6 Claims. (Cl. 55—118)

This invention relates to a sprout destroyer, that is to a device adapted to strip and shred brush and shrubs for the purpose of reducing them and causing them to die.

Heretofore devices of this character have been suggested, utilizing as does the present invention, a reel to which is attached chains which revolves as the device is hauled over an area, the chains striking the brush and shrubs shredding them and tearing buds, twigs and bark from the growth. This reduces the extent of the growth, but the principal object is to kill it. The devices heretofore suggested, however, have been primitive and have been neither efficient nor sufficiently rugged to withstand extensive use for the purpose intended.

The primary object of this invention is to produce a device of the character described which will be efficient, rugged and economical. Another object is to produce a device of the character having power means for rotating the reel independently of the traction wheels. This may comprise a transmission connection which can be attached to the power take-off of a tractor to which the device is hitched, or to an independent motor mounted on the frame of the device.

Another object of the invention is to provide a device which may be drawn over or through the brush or shrubs growing on any type of ground, even when the ground is too rough or too steep for a direct connected tractor, team, or other motive power, to travel. That is to say, means are provided whereby the device may be attached to wire ropes or other flexible connections and the device drawn back and forth across rough or steep ground by a tractor, team, hoist, winch, or other power which pulls the attached lines from the nearest adjacent ground on which the motor power may be operated.

A further object is to provide a device in which the shaft of the reel is always at the same height above the ground, so that the stripping and shredding chains will not revolve above or closer to the ground than is desired or required. Thus by mounting the reel and the main supporting wheels on a common shaft or axis, means for raising and lowering the reel are made unnecessary and eliminated.

A further object of the invention is to provide novel construction of the reel to give many advantages. Among these advantages are ruggedness, ease in changing the attachment of the chains so that fewer or more chains may be used depending upon the type and size of growth encountered, and to provide ease in making repairs.

Another object of the invention is to provide complementary devices which can be used in tandem, to treat a swath completely. Each device is arranged to treat the tract or space covered by the vehicular wheels of the other and which could not therefore be treated by the other. By providing one device in which the reel is mounted between the wheels relatively wide apart and providing another device in which the reels are mounted outwardly from two vehicular wheels relatively close together, it is possible to clear an area such as a right-of-way within a few inches of its edge or close to a fence, ditch or other obstruction.

Other and particular objects will be apparent from the following detail description.

While the invention is defined in the appended claims, the following detail description taken in connection with the accompanying drawings of a specific embodiment will explain it, and enable those skilled in the art to practice the invention.

Fig. 2 is a side elevational view of the device shown in Fig. 1;

Fig. 3 is a detail showing power take-off means on the device to supply a tandem device;

Fig. 4 is a detail showing the same mechanism illustrated in Fig. 3 but at right angles thereto;

Fig. 5 is a detail on an enlarged scale of the reel construction;

Fig. 6 is a view complementary to Fig. 5, showing the reel construction;

Fig. 7 is a detail of a modified form of reel construction;

Fig. 8 is a view complementary to Fig. 7;

Fig. 9 is a detail showing a second modification of the reel construction;

Fig. 10 is a detail complementary to Fig. 9;

Fig. 11 is a view on an enlarged scale showing a construction of a disc which may be used as a part of the reel construction;

Fig. 12, Fig. 13 and Fig. 14 are cross-sections showing alternate forms on an enlarged scale of construction for the attachment of chains to the reel;

Fig. 18 is a side elevational view on an enlarged scale, partly in section, showing the complementary device;

Fig. 19 and Fig. 20 are complementary views on an enlarged scale showing details of stationary shredding or marking means;

Fig. 21 and Fig. 22 are complementary views on an enlarged scale showing details of other stationary shredding and marking means;

Fig. 23 is a front elevational view on an enlarged scale of the complementary device; and Fig. 24 and Fig. 25 are complementary views on an enlarged scale showing details of stationary shredding and marking means.

Figure 1:
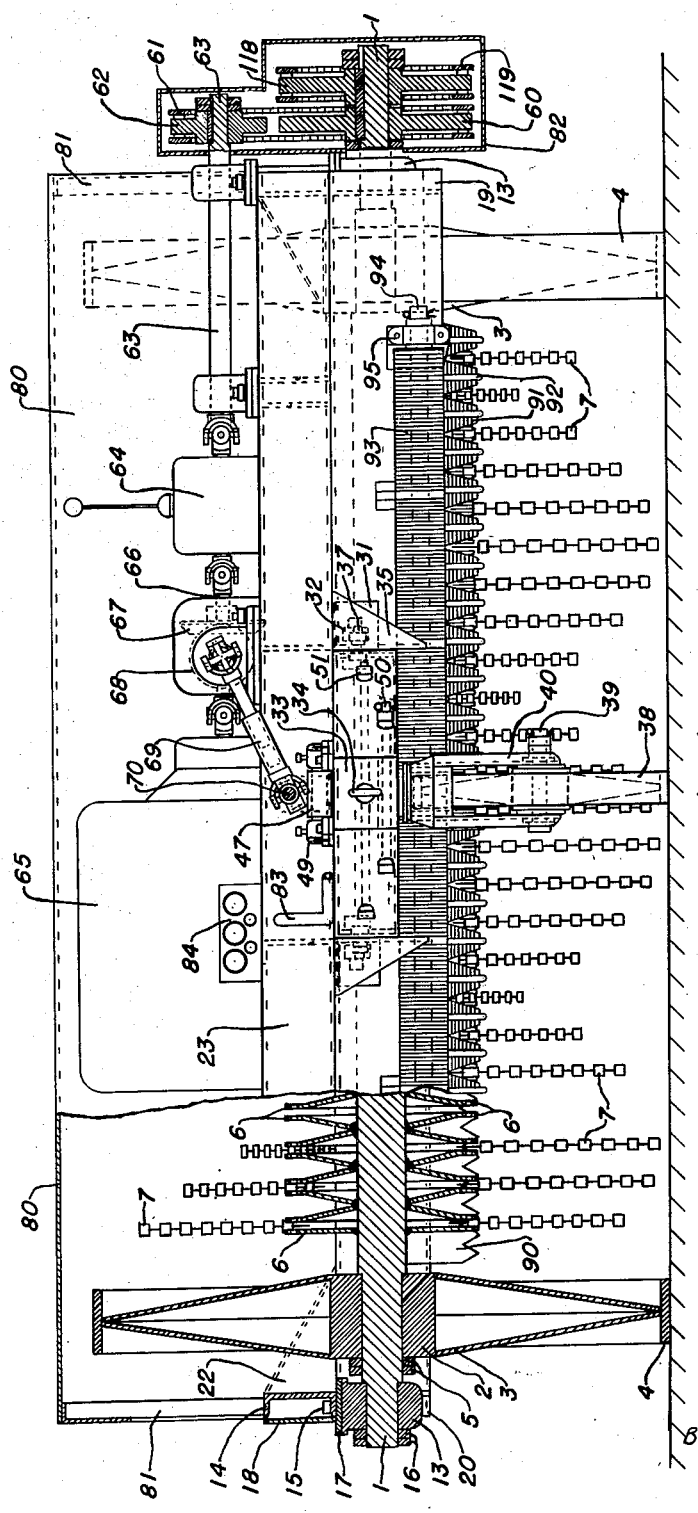
Fig. 1 is a front elevational view, partly in section, of a device embodying our invention.

A main shaft 1 constitutes a part of a beating reel which destroys the brush and shrubs, and is supported by a pair of vehicular wheels and supports a frame. The wheels each include a hub 2, discs 3 and a rim 4 with the hubs 2 abutting shoulders on the shaft 1 and secured by nuts 5.

The reel is formed, as specifically shown in Figs. 1, 5 and 6, by the shaft 1 and a series of circular discs or plates 6, which are arranged in pairs and welded to the shaft 1. Flexible beating members, or chains 7 of any desired number, three as specifically shown, are attached to each pair of discs and are arranged to be rotated as sprout beating elements, the chains, by their flexible nature, being capable of entwining the growths which they contact to remove leaves and bark therefrom. One method of such attachment is specifically shown in Fig. 14, in which the end link is held by a pin 8 passing through holes 9 in the discs 6. In this case side washers 10 are spaced by a sleeve 11 about the pin 8 and a bushing 12 is placed inside the link of the chain and about the sleeve 11.

Pillow blocks 13 are journalled on the ends respectively of the shaft 1 beyond the hubs 2 of the wheels and are attached to the frame, whereby the frame is supported on the shaft. Specifically the pillow blocks are attached to the underside of frame side members 14 by bolts 15, and are held in position on the shaft by nuts 16. In order to form a more rugged section for the two frame side members 14, plates 17 and 18 are welded to the bottom and side respectively of frame members 14. The frame includes the two parallel side members 14, a front cross member 19 and a rear cross member 20, the cross members being welded to the underside of the members 14 and cover braces 21 and 22. A pair of parallel cross members 23, secured at their ends to the frame side members 14, provide a support for an internal combustion engine and driving apparatus, and further provide rigidity to the frame.

A tongue or draw-bar assembly includes side members 30 which are arranged at a converging angle, and each is pivotally connected at its rear to a bracket 31 by a bolt 32. At their front ends the side members 30 are connected by a plate 33 to which is secured a ring 34 by which the device may be attached to a tractor or other source of motive power. Brackets 35 attached to the underside of the side members 14 have a series of holes 36 through which are inserted a bolt or bar 37 passing through holes also in the tongue side members 30 to hold the tongue rigidly in different adjusted positions. When an internal combustion engine is used on the device it is desirable, so far as possible, to keep the engine in an approximately level position. Thus by providing means for adjusting the tongue, the device is adapted to be attached directly to tractors having connecting means at different elevations from the ground.

A retractable pilot wheel 38 is attached to the front end of the tongue or draw-bar assembly by a swivel connection. The wheel 38 is journalled on an axle 39 on a forked support 40, which support is journalled for rotation in a housing 41. Specifically the support 40 has a hollow stub shaft 42 journalled in a sleeve 43 fixed in the housing. The hollow stub shaft 42 is provided with a top plate 44, which lies beneath a top plate 45 on the housing. A bolt 46 connects the two plates 44 and 45, thus holding the plates in assembly.

To make the wheel 38 retractable, the forward edge of the housing is secured to a hinged sleeve 47 pivoted on a pin 48 fixed at its ends in fittings 49, secured to the top of the tongue side members 30. A bolt 50 passing through the side members 30 holds the wheel assembly in down position, and a bolt 51 also passing through the side members 30 and appropriate holes in the wheel 38 holds the wheel assembly in retracted position.

For regular operation with the device connected to a tractor, the retractable wheel 38 is held in retracted position, the front end of the device being supported by the tractor. The wheel 38 may be lowered to support the device when disconnected from the tractor, and to serve as a third wheel when the device is drawn by a cable, as it may be where the area to be treated is too rough for tractor operation.

The reel is rotated by a sprocket 60 keyed on one end of the shaft 1, and driven by a chain 61 through a sprocket 62 keyed on a shaft 63. The shaft 63 is connected through a speed changing device 64 to a motor 65. The transmission for the shaft 63 from the motor 65 includes a throw-out clutch and a service clutch not shown in detail.

The transmission includes connecting mechanism having a shaft 66 on which is mounted a spur gear 67, in mesh with a spur gear 68, driven by a flexible coupling 69, through which the device may be connected to a tractor power take-off shaft 70.

It may be understood now that the reel may be operated either by the motor 65 or by a tractor power-take-off shaft or connection. It will be apparent, of course, that provisions for both power means need not be made. The use of an independent motor is preferable since a constant speed of the reel may be maintained by the use of an independent motor, especially when that motor is provided with a governor. For many purposes, however, the speed of the reel can be maintained in satisfactory limits by connecting it with the power take-off of the tractor. The use of an independent motor is necessary if the device is drawn by a cable or if it is drawn by animals, or by a tractor in which suitable power take-off means are not provided.

A semi-circular guard plate 80 is attached to the front cross member 19 and the rear cross member 20. It extends transversely over the wheels from one side member 14 to the other side member 14, and is supported by angles 81, the bottoms of which are attached to the frame side members 14. A guard or housing 82 is provided for the driving chain 61 and its sprockets 60 and 62.

Flexible connections for starter, ignition and indicating gauges for the motor may be located inside a flexible conduit 83, and connecting a control panel 84 and a remote control panel 85.

Means fixed on the frame are provided for additional destructive effort on the brush and sprouts, and are presently described.

A series of aligned vertical plates 90 having serrated lower edges are attached to and depend from the rear cross member 20, and are adapted to further mutilate and remove twigs and bark from the brush, after having been beaten by the reel. These plates are shown in detail in Figs. 19 and 20.

Figs. 21 and 22 show rasping devices which are attached to the bottom of the front cross member 19. These comprise cones 91 with sharp annular ridges on their faces and secured in position by yokes 92. Such devices score or mark the brush, making the beating reel more effective.

Other rasping devices, shown in Figs. 24 and 25, are attached to the front face of the front cross member 19. These comprise a series of cylinders 93 having sharp rings cut in their surfaces and arranged on a shaft 94 mounted on fittings 95 secured to the front face of the front cross member 19.

One specific form of reel construction is illustrated in Figs. 5, 6, and 14, and has already been described. Another form is illustrated in Figs. 7 and 8. In this case the discs 6 are attached or welded to collars 100, which are keyed to the shaft 1 (see Fig. 23). Preferably two adjacent discs are welded on one collar.

A further modification of the reel is shown in Figs. 9 and 10. In this case a single disc 6 is used for each set of beating chains 7, the disc being welded directly to the shaft 1. The chains may be attached to the disc as shown in Figs. 12 and 13. As shown in Fig. 12 a pair of links 101 connect the chain to the disc; a pin 102 connecting one end of the links 101 with the disc 6 and a pin 103 connecting the outer end of the links 101 with the end link of the chain 7. As shown in Fig. 13, a shackle 104 passing through the end link of the chain 7 is connected to the disc 6 by a pin 105.

Fig. 11 shows a preferred construction of the disc 6 which has ears 106 struck outward from the convex face of the disc 6, forming a rasping surface which is adapted to tear and shred shrubbery which comes in contact with the hub of the wheel.

Figure 15:
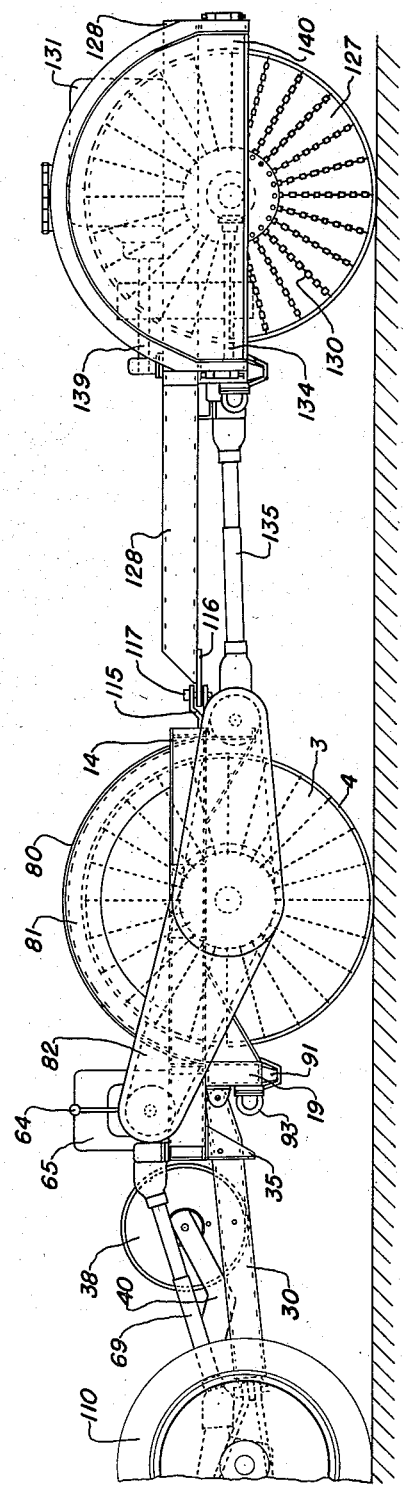
Fig. 15 is an elevational side view showing two complementary devices in tandem.

Fig. 15 shows a tandem arrangement of two complementary devices in which the device heretofore described and specifically illustrated in Figs. 1 and 2 is attached to a tractor 110, while a complementary sprouter is connected to the rear of the first device. The complementary device has a pair of reels arranged to overlap and extend beyond the swath covered by the first device.

Figure 17:
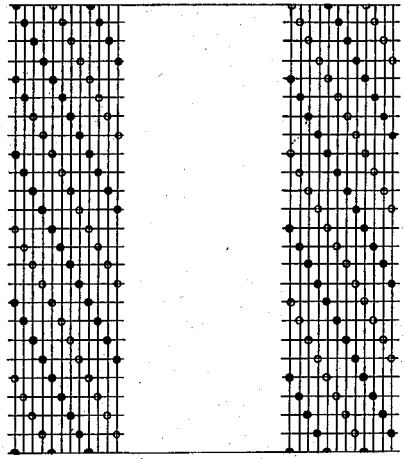
Fig. 17 is a chart similar to Fig. 16, showing the pattern of the complementary device.
Figure 16:
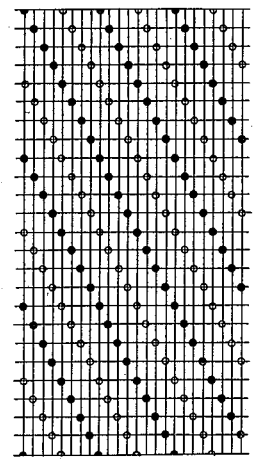
Fig. 16 is a chart showing the pattern produced by the reel of one of the devices during one revolution.

Figs. 16 and 17 are charts showing the design of the swaths. Each chart indicates a swath covered by one revolution of the reel. The solid heavy dots indicate the pattern when three chains are applied to a disc or pair of discs, while the open circles indicate the additional design when six chains are attached.

For the purpose of attaching the rear device, an appropriate fitting 115 is secured to the rear frame member 20, so constructed that a ring 116 on the rear tandem device may be engaged by a pin 117.

A power take-off is also provided on the front device. A sprocket 118 is keyed to the outer end of the shaft 1 and connected by a chain 119 to a sprocket 120 on a transmission shaft 121, journalled on pillow blocks 122 secured to the rear cross member 20. By a pair of spur gears 123 and 124 the power is transmitted to a central power take-off shaft 125 which is adapted to be connected to a flexible transmission for the rear device.

The rear device includes a shaft 126 which is supported by a pair of wheels 127 and supports a frame 128, the shaft 126 being journalled on blocks 129 on the underside of the frame. In this device the supporting wheels 127 are relatively close together while the reels 130 are on ends of the shaft 126 extending beyond the wheels respectively. In this case the reels are preferably formed in the manner heretofore described in connection with Figs. 7 and 8, in which discs 6 are secured in pairs to collars 100 that are keyed to the shaft 126. The arrangement permits removal of the discs and chains in order to remove the wheels or to remove the shaft 126 from the frame.

Although power transmission has been provided from the forward device, the rear device may be and preferably is provided with an independent motor or internal combustion engine 131.

The main or reel shaft 126 is provided with a bevel gear 132, in mesh with a gear 133 on a shaft 134, which is connected by a flexible connector 135 with the power take-off shaft 125 on the front device.

A sprocket 126 is keyed on the power shaft 134 and is connected by a chain 137 to a sprocket 138 on a motor driven shaft 139. The shaft 139 is driven by the motor or an internal combustion engine 131 through appropriate clutch or clutches and speed changing devices not specifically shown.

The reels 130 are provided with semi-cylindrical guards 140 to which are hinged end cover members 141.

It will be clear that if the two devices are connected in tandem an area can be cleared of brush or sprouts close to a line or fence. The reel of one device will destroy the growth along a swath which is followed by the wheels of the second device; while the reels of the second device will destroy the growth in a swath which is traversed by the wheels of the other device. Thus the two are complementary. It will be seen, of course, that one device may be used without the other, and that either device may be placed in the lead.

It will be apparent from the foregoing description that the invention accomplishes its objects. Various changes may be made in the details of construction, within the scope of the appended claims, and such changes are contemplated, without departing from the spirit of this invention. Parts of the invention may be used without the whole.

We claim:

1. In a sprout destroyer, a beating reel comprising a shaft, and a series of pairs of dished convex plates fixed to the shaft with their convex surfaces disposed outwardly, each pair having a chain secured to the periphery of the plates said chains being proportioned and arranged as sprout beating elements.

2. In a sprout destroyer, a beating reel having a shaft, a convex circular sheet metal plate secured to said shaft, a chain secured to the periphery of the plate, and ears struck out from the body of the plate positioned, adapted and arranged to form a rasping surface to tear and shred shrubbery.

3. In a sprout destroyer, a beating reel comprising a shaft, a plurality of pairs of circular discs secured to the shaft, each pair of discs having a series of alined holes spaced about their periphery, and chains proportioned and arranged as sprout beating elements secured to said discs by pins passing through said holes.

4. A sprout destroyer having a frame, a beating reel journalled in the frame, a stripping device secured across the bottom of the frame at the rear of said beating reel comprising a vertical plate having a serrated bottom edge depending from the frame.

5. A sprout destroyer having a frame, a reel with radial beating chains journalled in the frame, a rasping device secured across the frame in front of the reel comprising aligned cylindrical members on a horizontal axis and having sharp annular rings in their surface.

6. A sprout destroyer having a frame, a beating reel journalled in the frame, rasping members arranged laterally across the frame in front of the reel and comprising inverted cones depending from the frame and having sharp annuli in their surfaces.

JAMES C. BARTCH.
GEORGE W. COUCH.

REFERENCES CITED

The following references are of record in the file of this patent:

UNITED STATES PATENTS

| Number | Name | Date |
|---|---|---|
| 142,094 | Elliston | Aug. 26, 1873 |
| 495,105 | Buchanan | Apr. 11, 1893 |
| 508,906 | Allingham | Nov. 21, 1893 |
| 567,622 | Stephens | Sept. 15, 1896 |
| 732,194 | Lambert | June 30, 1903 |
| 1,006,752 | Hill | Oct. 24, 1911 |
| 1,035,056 | Shubert | Aug. 6, 1912 |
| 1,523,922 | Wales | Jan. 20, 1925 |
| 1,542,963 | Russell | June 23, 1925 |
| 1,637,098 | Barnes | July 26, 1927 |
| 2,341,486 | Swertfeger | Feb. 8, 1944 |
| 2,347,664 | Chilton | May 2, 1944 |

FOREIGN PATENTS

| Number | Country | Date |
|---|---|---|
| 47,225 | Austria | Apr. 10, 1911 |
| 368,762 | Germany | Feb. 9, 1923 |